United States Patent [19]

Evert

[11] 4,377,088
[45] Mar. 22, 1983

[54] ANGULAR POSITION SENSOR

[75] Inventor: Donald A. Evert, Littleton, Colo.

[73] Assignee: Honeywell Inc., Minneapolis, Minn.

[21] Appl. No.: 224,899

[22] Filed: Jan. 14, 1981

[51] Int. Cl.³ .................. G01N 29/00; G01B 7/14; G01B 7/30
[52] U.S. Cl. ................................. 73/640; 324/208; 73/633; 73/618
[58] Field of Search ............... 324/208; 73/633, 618, 73/634, 640

[56] References Cited

U.S. PATENT DOCUMENTS

| | | | |
|---|---|---|---|
| 3,185,920 | 5/1965 | Brunner | 324/208 |
| 3,824,455 | 7/1974 | Levitt et al. | 324/208 |
| 3,835,373 | 9/1974 | Matula | 324/208 |
| 4,092,867 | 6/1978 | Matzuk | 73/633 |
| 4,150,653 | 4/1979 | Grancoin | 324/208 |

FOREIGN PATENT DOCUMENTS 231889 8/1958 Australia .................. 324/208

Primary Examiner—Howard A. Birmiel
Attorney, Agent, or Firm—Charles J. Ungemach

[57] ABSTRACT

A position sensor for sensing the angular position of an oscillatory member includes a magnetic element which is permanently magnetized in a predetermined direction and is mounted as a unitary structural part of the oscillatory member for oscillatory movement therewith. A Hall plate sensor is positioned adjacent the magnetic element to detect changes in the magnetic field presented thereto by changes in position of the magnetic element. When the magnetic element is oscillated with the transducer, the magnetic field presented to the Hall plate is varied accordingly. This, in turn, produces an electrical signal as an output of the Hall plate which is a function of the instantaneous position of the magnetic element and hence of the oscillatory transducer. That electrical signal may then be used to produce synchronization signals for the imaging apparatus.

4 Claims, 4 Drawing Figures

ANGULAR POSITION SENSOR

CROSS REFERENCE

Cross reference is made to patent application Ser. No. 173,859, Dale O. Ballinger, titled ACOUSTIC TRANSDUCER HOUSING and filed on July 30, 1980, now U.S. Pat. No. 4,300,217.

BACKGROUND OF THE INVENTION

The present invention relates to electroacoustic transducers. More particularly, it relates to an angular position sensor for a scanning electroacoustic transducer.

In the art of medical diagnostics, one form of noninvasive examination of the internal organs of a body under examination involves the use of ultrasonic transducers. These transducers are frequently mounted within a housing filled with an inert liquid and arranged to oscillate in an angularly scanning motion. The housing is generally relatively opaque to the ultrasonic pulses generated by the transducer, with the exception of a relatively transparent window or diaphragm, in the operating end of the housing structure. The transducer is positioned and oscillated to direct the acoustic pulses through the diaphragm, or window, into the body under examination. The acoustic pulses transmitted into that body are then reflected back toward the transducer by interfaces of tissue within the body, to produce electrical pulses which may be translated into an image of the interior of the body being examined.

In order for those pulses to be translated into an image of the interior of the body, it is essential that the scanning of the transducer be synchronized with the display apparatus. While it is possible to derive a synchronizing signal from the control signal driving the oscillating mechanism. In theory, such a signal should be representative of the position of the transducer, in practice, however, the resulting signal may be significantly out of sync with the position of the transducer. Again, the position indicating signal may be derived from an electrical signal generator mechanically coupled to the oscillatory members. Such structure would tend to unduly load the oscillatory structure and, being mechanical in nature, would tend to rapidly wear out.

SUMMARY OF THE INVENTION

It is, accordingly, an object of the present invention to provide an improved angular position sensor which obviates the shortcomings of the aforementioned techniques.

It is another object of the present invention to provide an improved angular position sensor as set forth which is characterized in that it is a noncontacting sensor.

In accomplishing these and other objects, there has been provided, in accordance with the present invention, a position sensor for sensing the angular position of an oscillatory member wherein a magnetic element which is permanently magnetized in a predetermined direction is mounted as a unitary structural part of the oscillatory member for oscillatory movement therewith. A Hall plate sensor is positioned adjacent the magnetic element to detect changes in the magnetic field presented thereto by changes in position of the magnetic element. When the magnetic element is oscillated with the transducer, the magnetic field presented to the Hall plate is varied accordingly. This, in turn, produces an electrical signal as an output of the Hall plate which is a function of the instantaneous position of the magnetic element and hence of the oscillatory transducer. That electrical signal may then be used to produce synchronization signals for the imaging apparatus.

BRIEF DESCRIPTION OF THE DRAWINGS

A better understanding of the present invention may be had from the following detailed description when read in the light of the accompanying drawings, in which.

DETAILED DESCRIPTION

Figure 1:
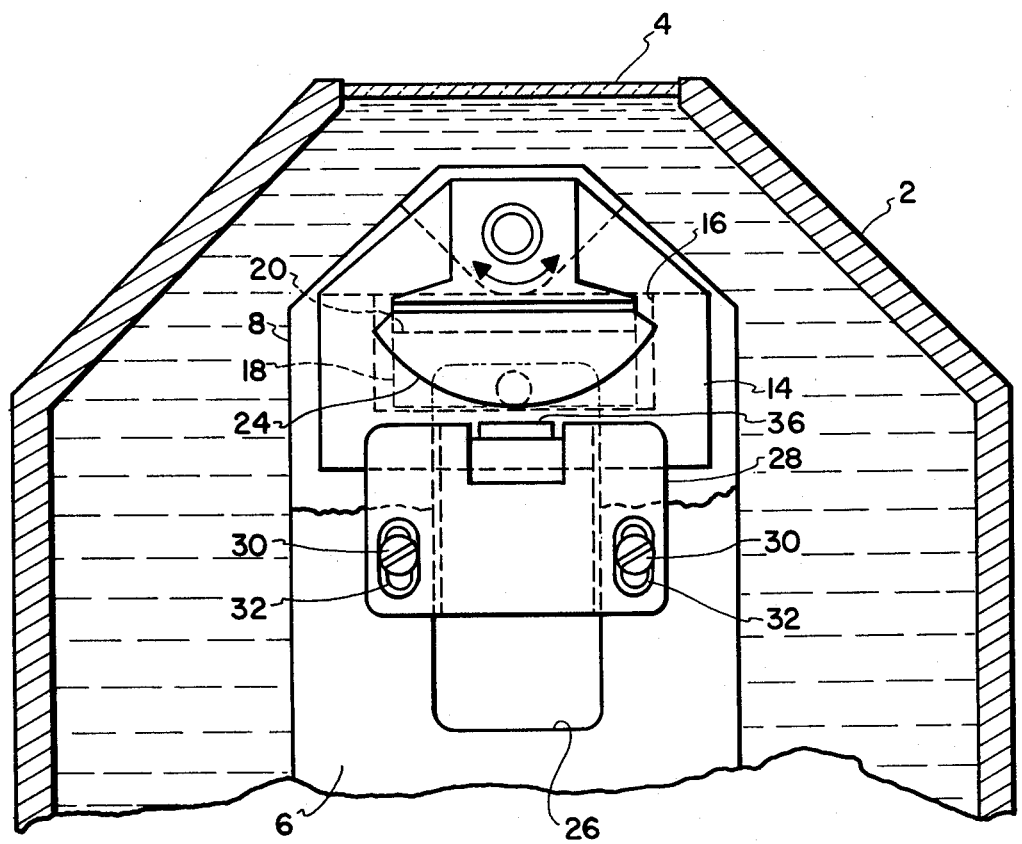
FIG. 1 is a side elevational view, partly broken away, of a structure embodying the present invention.
Figure 2:
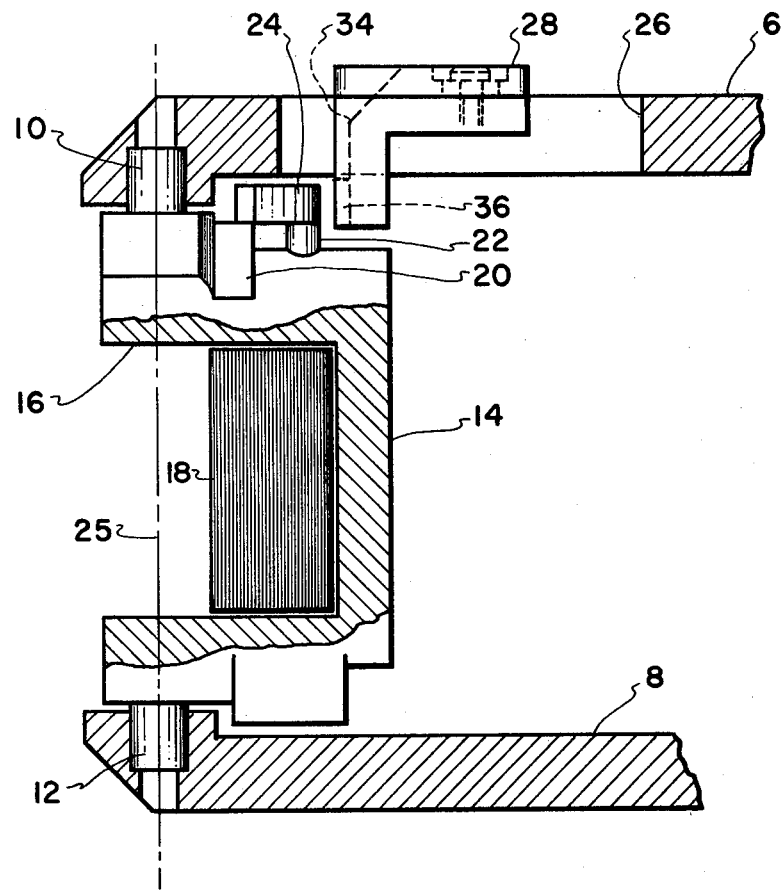
FIG. 2 is a front cross sectional view of the structure shown in FIG. 1.

Referring now to the drawings in more detail, there is shown in FIG. 1, and in part in FIG. 2 a portion of an electroacoustic transducer assembly for use in medical diagnostics. The assembly includes a housing member 2 which is basically cylindrical in form and having a truncated conical operating end portion. The truncated conical end portion has an acoustically transparent window 4 therein. Within the housing structure 2 there are positioned a pair of support members 6 and 8. Each of the support members 6 and 8, have near the outer end thereof a bearing receptacle 10 and 12 respectively. Supported between the two support members and by the bearing members 10 and 12, there is a transducer cradle 14. The cradle 14 has a well or receptacle 16 which is open toward the operating end of the transducer assembly represented by the window 4. Mounted within the well 16 is an electroacoustic ultrasonic transducer 18.

Figure 3:
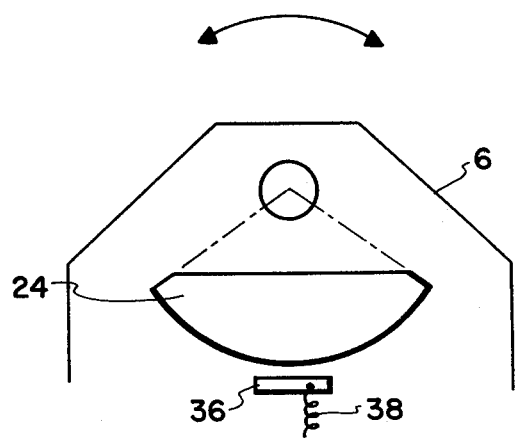
FIG. 3 is a simplified side view of the sensor elements of the structure shown in FIG. 1.
Figure 4:
FIG. 4 is a side view of a magnetic structure indicating the magnetization field of the structure.

At one side of the cradle 14, adjacent the support member 6 and just below the pivot arrangement 10, there is formed a first mounting boss 20. A second boss 22 is positioned near but slightly below the first boss 20. Securely mounted on the first and second boss 20 and 22 respectively, as by a suitable cement, there is a magnetic element 24. In a preferred embodiment constructed in accordance with the present invention, the magnetic element is in the form of a truncated circular sector, as illustrated most clearly in FIG. 3. The bearing members 10 and 12 define an axis 25 about which the cradle assembly 14 is angularly oscillated. The center of curvature of the arcuate surface of the magnetic element 24 may coincide with that axis or may be displaced up or down from the axis to shape or linearize the output. Again, in accordance with a preferred embodiment of the present invention, and as illustrated in FIG. 4, the magnetic element is magnetized such that the internal flux within the magnetic structure lies parallel to the major chord of the arcuate surface of the magnetic element 24.

The support member 6 is provided with a substantially rectangular aperture 26. A bracket 28 which is substantially L shaped as seen in FIG. 2 and would be substantially T shaped if seen from above, is adjustably secured to the support member 6 as by a pair of screws 30 fitted through elongated slots 32. A leg of the L shaped portion of the bracket 28 extends through the aperture 26 to a position underlying the outer edge of the magnetic element 24. The upper surface of that leg portion of the bracket 28 has a shallow but relatively wide groove 34 formed therein. Mounted within the groove 34 and at the outer extremity of the leg of the bracket 28 there is a Hall plate sensor 36. The electrical leads 38 connected to the Hall plate may be taken out through the groove 34.

In operation, through means not here illustrated, the cradle 14 is caused to oscillate about the axis 25 at a predetermined frequency through an angle which may, for example, be up to 75 degrees. When the operating end of the transducer assembly is held, for example, against the chest of a subject, and the transducer 18 is pulsed at a predetermined periodicity, the pulses will be transmitted into and received from the chest cavity of the subject covering the aforementioned scanning angle. The received acoustic pulses are converted by the transducer 18 to electrical signals which, in turn, may be transmitted to suitable signal processing apparatus for the conversion of those signals into an image of the structure within the chest cavity. As the cradle 14 is oscillated back and forth about the axis 25, the magnetic element 24, rigidly secured thereto, is also oscillated about the same axis. The Hall plate 36 supported by the bracket 28 is positioned adjacent to but slightly spaced from the arcuate surface of the magnetic element 24. As the magnetic element 24 is oscillated about the axis of rotation, the magnetic field presented to the sensor 36 is varied in accordance with the instantaneous position of the magnetic element 24. As the magnetic field presented to the sensor 36 is varied, the output signal produced by the sensor 36 varies substantially linearly with the variation of the presented magnetic field. The magnitude of the thus resulting electrical signal is, accordingly, representative of the instantaneous position of the magnetic element 24 and, hence, of the position of the cradle 14 carrying the transducer 18. These signals may then be used to coordinate the operation of the imaging system.

Thus, there has been provided, in accordance with the present invention, an improved angular position sensor for a scanning ultrasonic transducer wherein the position detector is non contacting with respect to the oscillating structure.

The embodiments of the invention in which an exclusive property or privilege is claimed are defined as follows:

1. A position sensor for sensing the position of a mechanically oscillating member, said oscillating member being rotationally oscillated about a predetermined axis, said position sensor comprising:

a magnetic element having an arcuate surface, the center of curvature of which is displaced from said axis mounted for oscillatory motion about said axis, said magnetic element establishing a magnetic field having a fixed orientation relative to said magnetic element;

a magnetic field responsive signal means fixedly positioned adjacent to but slightly spaced from said magnetic element, said signal means being responsive to the instantaneous value of the magnetic field presented thereto by said magnetic element, the displacement of the center of curvature of the arcuate surface and said axis causing said instantaneous value to be substantially linearly variable in accordance with the instantaneous position of said magnetic element relative to said signal means; and means for oscillating said magnetic element coincidentally with said oscillating member to produce signals from said signal means representative of the instantaneous position of said oscillating member.

2. A position sensor as set forth in claim 1 wherein said signal means is a Hall plate magnetic field detector.

3. A position sensor as set forth in claim 2, wherein said element has a circularly arcuate edge centered substantially on said axis, arcuate surface is substantially circular and positioned adjacent said arcuate surface.

4. A position sensor as set forth in claim 3 wherein said magnetic element is magnetically polarized in a direction perpendicular to a line between said axis and the median point of said arcuate surface.

* * * * *